US012778030B2

(12) United States Patent
Wofford, V

(10) Patent No.: US 12,778,030 B2
(45) Date of Patent: Nov. 3, 2026

(54) CONTAINER FOR POTTING A PLANT AND METHOD FOR MANUFACTURING THE SAME

(71) Applicant: John Elihu Wofford, V, New York, NY (US)

(72) Inventor: John Elihu Wofford, V, New York, NY (US)

( * ) Notice: Subject to any disclaimer, the term of this patent is extended or adjusted under 35 U.S.C. 154(b) by 19 days.

(21) Appl. No.: 18/899,613

(22) Filed: Sep. 27, 2024

(65) Prior Publication Data

US 2026/0090506 A1 Apr. 2, 2026

(51) Int. Cl.
*A01G 9/02* (2018.01)
*B33Y 80/00* (2015.01)

(52) U.S. Cl.
CPC .............. *A01G 9/021* (2013.01); *B33Y 80/00* (2014.12)

(58) Field of Classification Search
CPC ...................................................... A01G 9/021
See application file for complete search history.

(56) References Cited

U.S. PATENT DOCUMENTS

| | | | | |
|---|---|---|---|---|
| 3,894,355 | A * | 7/1975 | Carothers | A01G 9/022 47/DIG. 10 |
| 4,142,324 | A | 3/1979 | Magyar, Jr. | |
| 4,211,036 | A | 7/1980 | Dalitz | |
| 4,257,810 | A | 3/1981 | Narumiya | |
| 6,606,821 | B1 * | 8/2003 | Connelly | A01G 27/006 71/64.11 |
| 7,743,554 | B2 * | 6/2010 | Morris | A01G 9/021 47/65.6 |
| 9,944,021 | B2 | 4/2018 | Easter et al. | |
| 10,704,841 | B2 * | 7/2020 | Manzo | B22F 3/1115 |
| 10,834,877 | B2 * | 11/2020 | Handley | A01G 22/00 |
| 11,449,030 | B2 * | 9/2022 | Takeuchi | A01G 24/60 |
| 12,173,771 | B2 * | 12/2024 | Kabaria | B29C 64/106 |
| 2011/0010989 | A1 | 1/2011 | Hinsperger | |
| 2013/0133255 | A1 | 5/2013 | Wu | |
| 2015/0027046 | A1 | 1/2015 | Adolf | |
| 2018/0110193 | A1 | 4/2018 | Marmolejo | |
| 2018/0368344 | A1 | 12/2018 | Marshall | |

(Continued)

FOREIGN PATENT DOCUMENTS

| | | | | |
|---|---|---|---|---|
| CH | 714672 B1 | * | 4/2022 | B65D 25/2823 |
| CN | 205337001 U | * | 6/2016 | |
| KR | 20190040146 A | * | 4/2019 | A01G 9/026 |

OTHER PUBLICATIONS

Plant Pot TPMS Lattice HyDesign, https://www.printables.com/model/963153-plant-pot-tpms-lattice-hydesign (Year: 2024).*

*Primary Examiner* — Magdalena Topolski
(74) *Attorney, Agent, or Firm* — Welsh IP Law LLC

(57) ABSTRACT

A container featuring a three-dimensional drainage system. The container comprises a wall and a base with a mesh structure incorporating a channel structure that inhibits water flow. Triply Periodic Minimal Surface (TPMS) geometries may be used. In the context of plant containers, this design, created through additive manufacturing, allows for efficient water drainage while retaining soil and nutrients. The TPMS structure, such as gyroid architecture, provides superior fluid flow and soil retention compared to traditional perforated bases and eliminates the need for plastics. The design improves plant health through optimized drainage and aeration.

28 Claims, 8 Drawing Sheets

(56) References Cited

U.S. PATENT DOCUMENTS

| | | | |
|---|---|---|---|
| 2019/0160704 | A1 | 5/2019 | Goodman |
| 2021/0394391 | A1 | 12/2021 | Minary-Jolandan et al. |
| 2022/0232780 | A1 | 7/2022 | Smith |
| 2022/0330501 | A1 | 10/2022 | Zarhi et al. |

* cited by examiner

CONTAINER FOR POTTING A PLANT AND METHOD FOR MANUFACTURING THE SAME

TECHNICAL FIELD

The present disclosure generally relates to planters and horticultural containers. More specifically, the present invention relates to a planter system with improved drainage and a method of manufacturing the same.

BACKGROUND

Plastic planters have thin bottoms, often with wide perforations which allow soil to escape when watering. Mass-produced ceramic planters often require plastic or metal screens in the bottom to cover the drainage hole(s). Existing planters feature a "2-Dimensional" method of drainage, whereby the base material (plastic or ceramic) is perforated in a subtractive process. This method of drainage is limited in its effectiveness and often results in the loss of soil and other growing materials.

The traditional method of creating drainage in planters involves a subtractive process, which perforates the base material. Current planter openings vary in size. In ceramic planters, openings are often a single large perforation. This structure is a disadvantage because it may not provide adequate drainage and ventilation. In plastic planters, openings are often numerous and "2-dimensional". This structure is a disadvantage because it may lead to the material loss of soil and small growing materials. The results are inefficient drainage that can adversely affect the health and growth of the plant.

Traditional ceramic planters, while more durable than plastic ones, still face drainage issues. They often require additional components such as plastic or metal screens to cover the drainage holes. These screens can become clogged, leading to poor drainage and potential root rot in plants. Current options do not adequately address the need for improved drainage. Ceramic construction avoids the use of plastic and petrochemical products and the single-use nature of plastic nursery pots that might not be recycled.

Existing planters also fail to incorporate manufacturing techniques that could enhance their functionality. The reliance on traditional methods limits the potential for innovation in planter design. As a result, there is a need for a new approach that combines effective drainage with sustainable materials and modern manufacturing processes.

In summary, the current state of planters, whether plastic or ceramic, presents several problems related to drainage efficiency, environmental impact, and durability. These issues highlight the necessity for advancements in planter design and production to meet the growing demand for sustainable and functional horticultural products Thus, there exists a need in the art for an improved container for potting plants and a method of manufacturing the same.

SUMMARY OF THE INVENTION

The needs set forth herein as well as further and other needs and advantages are addressed by the present teachings, which illustrate solutions and advantages described below.

It is one objective of the present teachings to remedy the above drawbacks and issues associated with known plant containers.

The present invention resides in one aspect in a pot for cultivating a plant comprising a wall extending between a top and a bottom, the wall defining a cavity between the top and the bottom for receiving a plant and an organic and or inorganic growing materials associated with the plant. The pot includes a plant opening between an area outside the cavity and an area inside the cavity defined at least in part by the top of the wall. A base proximate to the bottom of the wall further defines the cavity, with the base having an inner surface adjacent to the cavity and an outer surface adjacent to the area outside of the cavity. The base has a thickness between the inner surface and the outer surface, and both the base and the wall retain the plant and the organic growing material in the cavity. The base comprises a mesh with a plurality of channels therein, each providing fluid communication between the cavity and the area outside the cavity.

In yet a further embodiment of the present invention, the base further comprises a Triply Periodic Minimal Surface (TPMS) portion integrally formed with the base via 3D printing, extending from the inner surface through the thickness of the base to the outer surface.

In yet a further embodiment of the present invention, the TPMS portion forms the channels In yet a further embodiment of the present invention, the TPMS architecture provides for the flow of fluid through the mesh base while inhibiting the flow of solid material through the mesh base.

In yet a further embodiment of the present invention, the TPMS portion features a gyroid architecture.

In yet a further embodiment of the present invention, the 3D printing process used to create the TPMS portion involves liquid deposition modeling.

In yet a further embodiment of the present invention, the wall of the pot for cultivating a plant and mesh base is made of a biodegradable material.

In yet a further embodiment of the present invention, the wall of the pot for cultivating a plant and mesh base is made of a ceramic material.

In yet a further embodiment of the present invention, the biodegradable material includes a composite of fibers and a biodegradable polymer.

In yet a further embodiment of the present invention, the ceramic material includes alumina, zirconia, kaolin, silica, feldspar or a combination thereof.

In yet a further embodiment of the present invention, the channels in the mesh base have diameters ranging from 0.5 mm to 10 mm to ensure optimal fluid drainage while retaining the growing material.

In yet a further embodiment of the present invention, the channels have diameters ranging from 0.5 mm to 7 mm.

In yet a further embodiment of the present invention, the channels can have diameters ranging from 1 mm to 5 mm.

In yet a further embodiment of the present invention, the channels can have diameters ranging from 1.5 mm to 3.5 mm.

In yet a further embodiment of the present invention, the channels can also have diameters ranging from 2 mm to 3 mm.

The present invention resides in another aspect in a plant cultivating container comprising a wall extending between a top and a bottom, the wall defining a cavity between the top and the bottom for receiving a plant and an organic and/or inorganic growing material associated with the plant. The container includes a plant opening between an area outside the cavity and an area inside the cavity defined at least in part by the top of the wall. A base proximate to the bottom of the wall further defines the cavity, with the base having an inner surface adjacent to the cavity and an outer surface adjacent to the area outside the cavity. The base has a thickness between the inner surface and the outer surface, and both the base and the wall retain the plant and the organic growing material in the cavity. The base comprises a mesh with a plurality of channels therein, each providing fluid communication between the cavity and the area outside the cavity. Additionally, the base includes a porous structure integrally formed with the mesh via additive manufacturing, extending continuously from the inner surface through the thickness of the base to the outer surface, thereby forming at least a portion of the channels.

In yet a further embodiment of the present invention, the porous structure forms an architecture that allows for the flow of fluid through the mesh base while inhibiting the flow of solid material.

In yet a further embodiment of the present invention, the porous structure features interconnected voids with a porosity between 30% and 70%.

In yet a further embodiment of the present invention, the additive manufacturing methods used to create the porous structure include liquid deposition modeling, fused deposition modeling, or stereolithography.

In yet a further embodiment of the present invention, the wall of the plant cultivating container is made from a biodegradable material comprising a composite of natural fibers and a biodegradable polymer.

These and other aspects of the present invention will become apparent in light of the drawings and detailed description provided below.

DETAILED DESCRIPTION

The present invention relates to an improved system for potting plants and a method for manufacturing the same. This detailed description will provide a comprehensive overview of the invention, its various embodiments, and the manufacturing processes involved.

Figure 1:
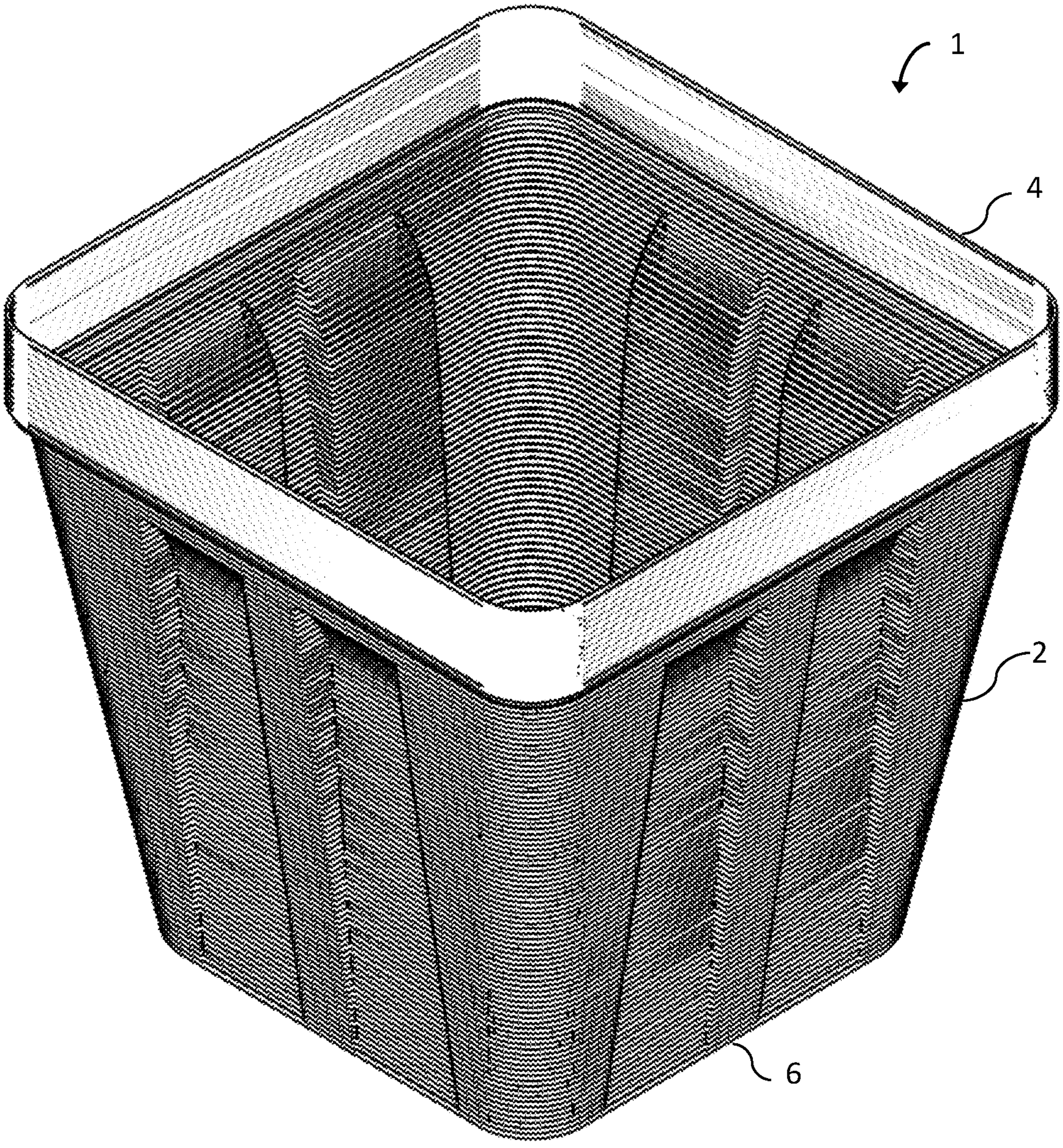
FIG. 1 illustrates a perspective view of a pot for cultivating a plant in accordance with one embodiment of the present invention.

Referring to FIG. 1, a perspective view of the pot 1 for cultivating a plant is shown. The pot 1 comprises a wall 2 extending between a top 4 and a bottom 6. The wall 2 defines a cavity 8 between the top 4 and the bottom 6, which is configured to receive a plant and growing materials associated with the plant.

Figure 2:
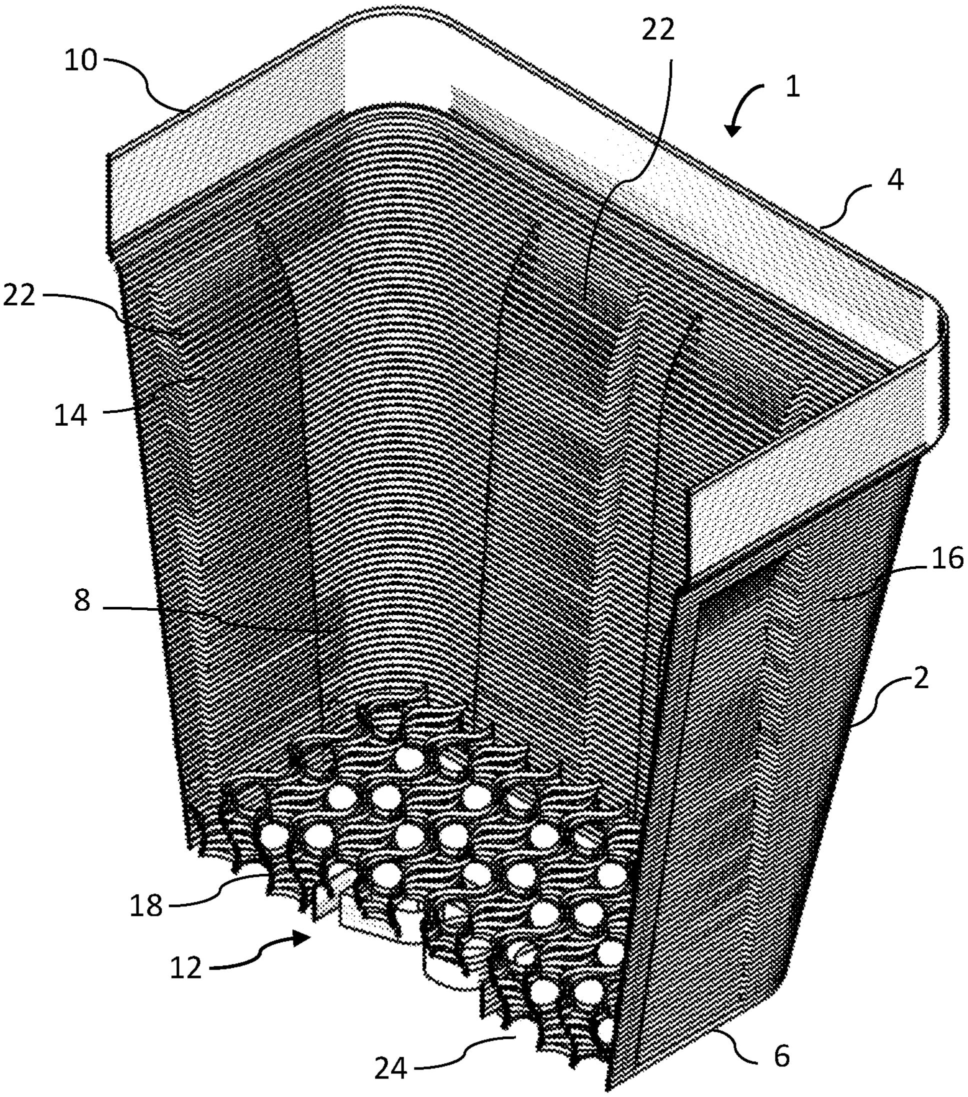
FIG. 2 is a cross sectional view of the pot for cultivating a plant shown in FIG. 1.
Figure 3A:
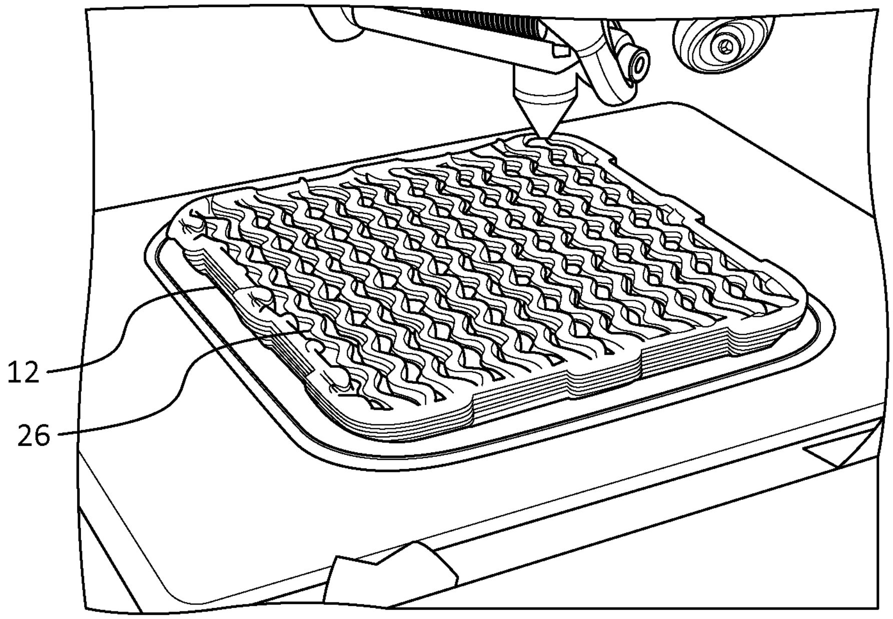
FIG. 3A is a perspective view of the base section during construction of a container in accordance with one embodiment of the present invention.
Figure 3B:
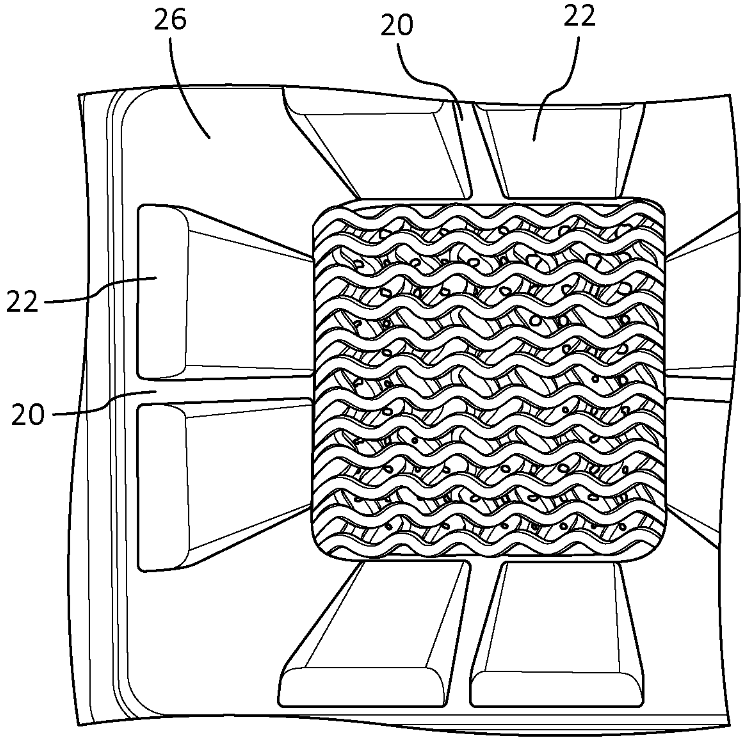
FIG. 3B is a top view of a container in accordance with one embodiment of the present invention.

As illustrated in FIG. 2, which shows a cross-sectional view of the pot 1, a plant opening 10 is defined at least in part by the top 4 of the wall 2. This opening 10 allows access between an area outside the cavity 8 and an area inside the cavity 8.

A base 12 is located proximate to the bottom 6 of the wall 2 and further defines the cavity 8. The base 12 has an inner surface 14 adjacent to the cavity 8 and an outer surface 16 adjacent to the area outside of the cavity 8. The base 12 has a thickness 18 between the inner surface 14 and the outer surface 16.

Together, the base 12 and the wall 2 are designed to retain the plant and the organic growing material within the cavity 8. This configuration ensures that the plant and its growing medium remain securely in place while allowing for proper drainage and aeration.

In the embodiment disclosed in FIG. 1, the wall 2 forms a quadrilateral in a plane perpendicular to an axis between the top 4 and bottom 6 of the wall. A person of skill in the art and familiar with this invention will understand that the wall 2 can take on various geometrical shapes in cross-section without departing from the spirit of the invention. These shapes may include, but are not limited to, circular, oval, triangular, pentagonal, hexagonal, or any other polygonal shape. Furthermore, the wall 2 may be tapered, either inward or outward, from top to bottom, creating a conical or inverted conical form. In some embodiments, the wall 2 may have a curved profile, such as a concave or convex curvature along its height. The wall 2 may also incorporate combinations of these features, such as a circular top transitioning to a square bottom, or vice versa. Additionally, the wall 2 may include decorative elements or functional features like ridges, grooves, or textured surfaces. These variations in wall shape and configuration allow for diverse aesthetic designs and can be tailored to specific plant requirements or spatial considerations.

In the embodiment disclosed in FIG. 1, the wall 2 has a thickness that extends between its inner 14 and outer surfaces 16. A person of skill in the art and familiar with this invention will understand that the thickness of the wall 2 can vary in numerous ways without departing from the spirit of the invention. The thickness may be uniform throughout the entire wall, or it may vary along the height, circumference, or both. In some embodiments, the wall 2 may have a graduated thickness, becoming thicker towards the bottom for increased stability, or thinner towards the top for reduced weight. The wall 2 may also incorporate variable thickness patterns, such as alternating thick and thin sections, or localized thickened areas for structural reinforcement or decorative purposes. In certain designs, the wall 2 might feature a hollow or cellular internal structure, providing insulation properties while maintaining strength. The thickness could also be tailored to accommodate specific features like built-in drainage channels, integrated supports for climbing plants, or recessed areas for labels or sensors. These variations in wall thickness allow for optimization of material usage, weight distribution, thermal properties, and overall structural integrity, while also enabling diverse functional and aesthetic designs tailored to specific plant requirements or manufacturing considerations.

In reference to FIG. 1 and FIG. 2, the wall 2 includes protrusions 22 formed on the inside surface thereof that extend between the top 4 and the bottom 6 of the wall. In the embodiment disclosed, each inside surface of the wall 2 includes two protrusions 22. The protrusions 22 define a channel 20 therebetween that extends from the top 4 to the bottom 6 of the wall 2. This channel 20 is intended to facilitate the ingress of fluid through an organic matter residing in the container by increasing variability of the wall 2 surface and the distribution of the growing material. The protrusions 22 and associated channels 20 serve multiple purposes: they enhance drainage, help retain grip on the planter especially during watering with slippery conditions, and provide structural support for the wall.

The number, size, shape, and spacing of these protrusions 22 may vary depending on the specific requirements of the plants and the overall design of the container. For instance, some embodiments may feature more than two protrusions per inside surface, or the protrusions may have a tapered or curved profile. The channels 20 formed by these protrusions may also vary in width and depth along their length to provide grip and structural support for container.

In some embodiments, these protrusions 22 and channels 20 may integrate with the drainage system in the base, creating a comprehensive water management solution throughout the entire container. They may also serve as guides for root growth, encouraging a deeper and more efficient root system.

A person of ordinary skill in the art and familiar with this invention will understand that although an embodiment is disclosed with these protrusions 22, the present invention is not limited in this regard. The present invention may be practiced without the protrusions 22 and associated channels 20, or with alternative internal structures designed to achieve similar functional benefits. The inclusion or exclusion of these features can be determined based on factors such as the specific plant species being cultivated, the intended growing conditions, manufacturing considerations, and aesthetic preferences.

A key feature of the present invention lies in the design of the base 12. Unlike traditional planters that use a simple perforated base, the base 12 in this invention comprises a mesh structure with a plurality of channels 24 therein. Each of these channels 24 provides fluid communication between the cavity 8 and the area outside of the cavity 9.

The inventor has discovered that the mesh structure represents a significant advancement over conventional “2-Dimensional” drainage methods. Instead of simply perforating the base material in a subtractive process, the mesh base 12 in accordance with some embodiments of the present invention is constructed via an additive process that builds layers of mesh. This innovative approach creates a “3-Dimensional” method of drainage that offers superior performance compared to traditional designs.

A key distinction lies in the complex, non-linear three-dimensional structure of the base 12 and its associated channels 24. Unlike traditional planters where drainage holes are merely perforations or straight channels through a flat base, the present invention utilizes a network of interconnected, winding channels that traverse the thickness of the base in various directions. Traditional planters have a single point for drainage, while this present invention allows for more even drainage and aeration using 3-dimensional mesh.

These channels 24 form a labyrinthine structure within the base 12, creating a tortuous path for water flow. This design cannot be achieved through traditional subtractive manufacturing methods such as drilling or punching, which are limited to creating straight, linear paths. The additive manufacturing process allows for the creation of channels that curve in three dimensions, optimizing water flow while effectively retaining soil particles.

The three-dimensional nature of these channels 24 provides several advantages, including increased surface area for water flow, enhancing drainage efficiency, better filtration of soil particles due to the non-linear path, improved water distribution throughout the base, promoting even moisture levels, and enhanced structural integrity compared to simple perforations.

The mesh structure of the base 12 is designed to trap small objects and soil particles while allowing water to flow through freely. This feature addresses a common problem in traditional planters where soil often escapes through wide perforations when watering, leading to mess and potential plant health issues.

In one embodiment of the invention, the base 12 further comprises a Triply Periodic Minimal Surface (TPMS) portion 26. This TPMS portion 26 is integrally formed with the base 12 via additive manufacturing, extending from the inner surface 14 through the thickness 18 of the base to the outer surface 16. It will be understood be a person of ordinary skill in the art and familiar with the disclosure that the TPMS portion may include or be defined by the channels 24 of the mesh section.

A TPMS is a complex mathematical surface that repeats itself in three independent directions in space, creating a regular, infinite structure, while also minimizing its surface area for given boundary conditions. The inventor has discovered that these surfaces possess unique properties that make them ideal for the drainage system in the planter base. TPMS structures have zero mean curvature at every point, are continuous and smooth with no edges or vertices, and divide space into two intertwined but non-intersecting labyrinths.

Common types of TPMS include Gyroid, Schwarz P (Primitive), and Schwarz D (Diamond) surfaces. In the context of this planter design, TPMS structures create a complex, three-dimensional mesh in the base 12, providing an ideal balance of fluid permeability and structural integrity. The continuous, smooth nature of TPMS allows for efficient water flow while effectively trapping soil particles.

These structures are well-suited for additive manufacturing techniques like 3D printing and liquid deposition molding and can be precisely controlled and customized through mathematical models.

TPMS structures offer several functional benefits, including a high surface area to volume ratio beneficial for fluid flow and filtration, excellent mechanical properties providing strength with minimal material use, and controllable porosity allowing for fine-tuning of drainage and soil retention properties.

It will be understood by a person of ordinary skill in the art and familiar with this invention that parts made from additive manufacturing processes have dimensional tolerances that may deviate from the specified dimensional values set forth in the CAD file having a geometric description of the object, including the TPMS structures. It will be understood by a person of ordinary skill in the art and familiar with this invention that the term CAD file having a geometric description of the object includes any set of electronic instructions for the additive manufacturing machine to produce an object with a specified geometry, which in this case incorporates TPMS structures. However, the actual manufactured part may have variations from the ideal TPMS shape designed in the CAD file due to the manufacturing process.

In some embodiments of the present invention, the TPMS structure is incorporated into the electronic CAD file using slicing engine software designed to translate 3D CAD files from modeled geometry into 2D slices for printer. For example, G-code may be used, although the present invention is not limited in this regard. Different settings may be input to achieve the desired structure, such as, but not limited to: height, print speed, flow rate, line widths, material retraction, walls, travel, infill, and seam locations. In some embodiments of the present invention, the printer reads the G-Code file and creates objects 1 layer at a time. It will be understood by a person of skill in the art and familiar with this invention that the method of creating the filing for the build may vary and is not limited in this regard.

The dimensional tolerances and potential variations from the TPMS shape are caused by several different factors associated with additive manufacturing. First, as the object dries after the printing job, it typically contracts and shrinks, which may alter the precise TPMS geometry. It is possible to account for this shrinkage by adjusting the geometric description of the object in the CAD file, but some variance is still likely. A second cause of the dimensional tolerance and shape variation is that the build material adjacent to the formed object may inadvertently adhere to the surface of the object, potentially altering the fine details of the TPMS structure. This effect can be seen on various surfaces of the object. Another factor that affects the dimensional tolerance and adherence to the CAD-designed TPMS shape is the subsequent buildup of layers that form the objects, which may introduce slight variations from the ideal TPMS structure designed in the CAD file.

The TPMS portion 26 forms the channels 24 within the mesh base 12. This structure creates an architecture that provides for the efficient flow of fluid through the mesh base while effectively inhibiting the flow of solid material. This dual functionality maintains proper soil moisture levels and preventing the loss of growing medium.

In one embodiment, the TPMS portion 26 features a gyroid architecture. Gyroid structures, characterized by their unique triply periodic minimal surface geometry, offer several advantages in this application. They provide a high surface area to volume ratio, excellent permeability, and superior structural strength using a minimum amount of material.

The gyroid architecture can be approximated by the equation: $\cos x \sin y+\cos y \sin z+\cos z \sin x=0$.

This mathematical representation allows for precise control over the structure's properties during the design and manufacturing process. Other TPMS structures that may be employed in alternative embodiments include Schwarz diamond structures and Schwarz primitive structures. These can be approximated by the following equations respectively: Schwarz diamond: $\sin x \sin y \sin z+\sin x \cos y \cos z+\cos x \cos y \sin z=0$; Schwarz primitive: $\cos x+\cos y+\cos z=0$.

The choice of TPMS structure can be tailored to specific requirements of plant species, growing conditions, or aesthetic preferences. TPMS structures are disclosed, for example, in U.S. Pat. No. 11,484,413 for Sheet based triply periodic minimal surface implants for promoting osseointegration and methods for producing same to Duke University and issued on Nov. 1, 2022. The contents of that disclosure are incorporated by reference as if set forth herein.

The innovative design of the pot 1, particularly its mesh base 12 with the TPMS portion 26, is formed via an additive manufacturing method. Traditional molding or casting methods are inadequate for producing such complex geometries as those found in TPMS structures. These conventional methods lack the precision and flexibility required to create the intricate, three-dimensional networks of channels and surfaces that characterize TPMS designs. Instead, the present invention utilizes additive manufacturing processes, which allow for the layer-by-layer construction of complex shapes directly from digital 3D models. This approach enables the creation of structures that would be impossible or impractical to produce using traditional manufacturing techniques.

The additive manufacturing process used to create the TPMS portion 26 can involve various techniques, each with its own advantages and characteristics. These techniques include Fused Deposition Modeling (FDM), which involves the extrusion of thermoplastic filaments; Stereolithography (SLA), using a laser to cure liquid resin; Selective Laser Sintering (SLS), employing a laser to sinter powdered materials; Digital Light Processing (DLP), utilizing a digital light projector to cure photopolymer resin; Binder Jetting, depositing a liquid binding agent onto powder materials; Material Jetting, depositing droplets of build material similar to inkjet printing; Electron Beam Melting (EBM), using an electron beam to melt metal powder; Directed Energy Deposition, melting materials as they are deposited; and Liquid Deposition Modeling (LDM), involving the controlled deposition of a liquid material. Each of these methods allows for the creation of complex, three-dimensional structures with high precision, though the specific choice may depend on factors such as the desired material properties, resolution requirements, and production scale. While these techniques offer high precision, it's important to note that the final product may still exhibit some variations from the ideal CAD model due to factors such as material properties, post-processing techniques, and the layer-by-layer nature of the build process.

In accordance with one embodiment of the present invention, liquid deposition modeling (LDM) is used for preparing the container. This advanced additive manufacturing technique is particularly well-suited for creating the complex geometries required in the TPMS structures of the pot's base.

The process begins with the preparation of a suitable liquid material. This could be a ceramic material, softened with higher water content to allow for extrusion. A ceramic material would result in a durable and porous structure, or a biodegradable polymer composite would align with eco-friendly objectives. The material's viscosity is a critical factor and is carefully controlled to ensure smooth deposition and optimal layer formation. The viscosity must be low enough to allow for easy extrusion through the nozzle, yet high enough to maintain its shape once deposited.

The deposition process is controlled by a sophisticated computer system. This system translates the CAD file, which contains the detailed TPMS geometry, into a series of precise movements for the deposition nozzle. This set of instructions is known as "G-code". The nozzle moves along a pre-programmed path, depositing the liquid material onto a build platform. Each layer of the pot 1, including its intricate base structure, is created through this carefully choreographed process.

The pot 1 is constructed layer by layer, with each layer allowed to partially solidify before the next is applied. This incremental building process is crucial for maintaining the integrity of the TPMS structures in the base 12. The partial solidification of each layer provides a stable foundation for subsequent layers, ensuring that the complex internal channels and surfaces of the TPMS portion 26 are accurately formed.

After the deposition process is complete, the pot 1 undergoes a controlled drying process. This step is critical for removing any remaining solvent or moisture from the structure. The drying must be carefully managed to prevent defects such as cracking or warping, which could compromise the functionality of the TPMS structures. The rate of drying may be controlled through environmental factors such as temperature and humidity.

Depending on the material used, additional post-processing steps may be necessary. For ceramic materials, this might involve a sintering process where the pot is heated to a temperature below its melting point, causing the particles to bond together. For polymer composites, UV curing or heat treatment might be applied. These post-processing steps are crucial for achieving the desired mechanical and thermal properties of the final product.

The use of LDM in this process allows for the creation of complex TPMS structures within the mesh base 12, which would be impossible to achieve with traditional manufacturing methods. This innovative approach enables the production of pots with superior drainage capabilities due to the precisely controlled internal channels. Furthermore, the LDM process allows for customizable designs, potentially tailoring the TPMS structures to the specific needs of different plant species or growing conditions. This level of customization and precision in manufacturing represents a significant advancement in horticultural container design.

The pot 10 can be manufactured using a variety of materials, chosen based on their suitability for the intended application and environmental considerations.

In one embodiment, the wall 2 of the pot 1 is made of a biodegradable material. This addresses the environmental concerns associated with traditional plastic planters. The biodegradable material may include a composite of natural fibers and a biodegradable polymer. Examples of natural fibers that can be used include bamboo, hemp, or coconut coir. Suitable biodegradable polymers include polylactic acid (PLA), polyhydroxyalkanoates (PHA), or starch-based plastics.

The use of biodegradable materials for the wall 2 offers several advantages: Reduced environmental impact compared to traditional plastic planters, Natural aesthetic that may be preferable for certain application, Potential for the pot to biodegrade after use, returning nutrients to the soil, In another embodiment, the mesh base 12 is made of a ceramic material.

Ceramic materials offer excellent durability and are exceptionally well-suited for the complex geometries of the TPMS structures in the pot's base. The use of ceramics in LDM for this application combines the benefits of advanced materials science with innovative manufacturing techniques. Suitable ceramic materials for this process include alumina (Al2O3), zirconia (ZrO2), kaolin ($Al_2Si_2O_5(OH)_4$, silica ($SiO_2$), feldspar ($KAlSi_3O_8$)/($NaAlSi_3O_8$) or a combination thereof. These materials are chosen for their superior properties, including high strength and durability, resistance to weathering and degradation, excellent thermal properties for soil temperature regulation, chemical inertness, and controllable porosity.

In the LDM process, these ceramics are typically used in the form of a slurry—a suspension of fine ceramic particles in a liquid medium. The slurry composition is critical, including finely ground ceramic powder, dispersants, binders, and plasticizers. The viscosity of this slurry must be precisely controlled to allow for accurate deposition while maintaining the shape of the printed structures. This careful control ensures that the intricate TPMS geometries can be faithfully reproduced in the final product.

After the printing process is complete, the structure undergoes a carefully controlled drying process to remove the liquid medium without distorting the TPMS structures. This step helps maintain the integrity of the complex geometries created during the LDM process. The drying process is crucial for the preparation of clay bodies for subsequent firing stages. This process involves the controlled evaporation of moisture content from the shaped clay body to prevent deformation and structural weaknesses.

The clay drying process involves two stages: the leather-hard stage and the bone-dry stage. Initially, after forming, the clay body is allowed to dry to a leather-hard state. At this stage, the clay contains sufficient moisture to be slightly flexible, enabling further detailing and refinement. This stage is characterized by the clay's increased strength compared to its wet state, yet it remains workable for additional sculpting or carving. Following the leather-hard stage, the clay body continues to dry until it reaches the bone-dry state. At this point, all residual moisture has evaporated, and the clay is fully dry, appearing chalky and brittle. The bone-dry stage is essential for preventing steam generation during the initial firing, which can cause cracking or explosions.

The Bisque Firing Process transforms the dried clay body into a ceramic material, making it more durable and ready for glazing. This step involves a controlled heating schedule to avoid thermal shock and ensure uniform sintering of the clay particles. Bisque firing involves loading the bone-dry clay bodies into the kiln, ensuring even spacing to allow for uniform heat distribution. Kiln shelves and posts are used to optimize space and stability within the kiln chamber. The kiln is programmed to gradually increase in temperature to prevent rapid thermal expansion. A typical firing schedule includes a slow ramp-up to approximately 1000° C. (Cone 04 to Cone 06, with Cone 04 being around 1070° C. and Cone 06 being around 999° C.). The slow heating rate ensures that any remaining moisture is driven off without causing structural damage. After reaching the peak temperature, the kiln is slowly cooled to room temperature. This controlled cooling process is vital to avoid thermal shock and ensure the bisque-fired ware is robust and ready for glazing.

The glaze firing process involves applying a glaze coating to the bisque-fired ware and subjecting it to a second firing. This process vitrifies the glaze and clay body, creating a smooth, glass-like surface that enhances both the aesthetic and functional properties of the ceramic piece. Glaze firing begins with the application of glaze materials, typically composed of silica, alumina, and fluxes, to the bisque-fired ware using various techniques such as brushing, dipping, or spraying. The application must be even to ensure a consistent finish. Once glazed, the pieces are loaded back into the kiln. Care is taken to prevent glazed surfaces from touching kiln shelves or other pieces to avoid fusing during firing. The kiln is fired to a higher temperature than the bisque firing to melt and fuse the glaze components. For porcelain and other high-fire clays, the typical glaze firing temperature ranges from Cone 5 to Cone 10 (Cone 5 being around 1196° C. and Cone 10 being around 1305° C.). The firing schedule includes a controlled ramp-up to the peak temperature, a soak period at peak temperature to ensure complete melting of the glaze, and a gradual cooldown to avoid thermal stress. After the firing cycle is complete, the kiln is allowed to cool slowly to room temperature. This cooling phase is critical to the development of the glaze surface and the overall integrity of the ceramic piece.

While the above description provides a detailed account of specific processes and temperature ranges for drying, bisque firing, and glaze firing of ceramic structures, it should be understood that the present invention is not limited to these particular methods or parameters. The techniques, temperatures, and materials described herein are illustrative and may be varied or adapted to suit different ceramic compositions, desired outcomes, or specific applications of the TPMS structures. The invention encompasses a range of alternative approaches, including but not limited to variations in drying techniques, firing schedules, temperature ranges, and glazing methods, that may be employed to achieve similar results in the production of ceramic TPMS structures. Furthermore, the invention may incorporate additional or alternative steps in the manufacturing process, as well as utilize emerging technologies or materials in the field of ceramics and additive manufacturing, without departing from the spirit and scope of the disclosed invention.

The result of this advanced manufacturing process is a planter base that combines the design freedom of additive manufacturing with the superior material properties of advanced ceramics. This combination offers unprecedented performance in terms of drainage, aeration, and plant support, while also providing excellent durability and aesthetic appeal. The TPMS structures, accurately reproduced in high-performance ceramic materials, create an optimal environment for plant growth that would be impossible to achieve with traditional manufacturing methods.

The choice of ceramic material for the base 12 can be tailored based on specific requirements such as strength, thermal properties, or aesthetic considerations.

The dimensions of the channels 24 in the mesh base 12 are important for determining to performance, in addition to the tortuous path and other factors. The channels must be large enough to allow efficient water drainage while small enough to retain the growing medium and prevent soil loss.

In various embodiments, the channels 24 in the mesh base 12 have diameters ranging from 0.5 mm to 10 mm. This range ensures optimal fluid drainage while retaining the growing material. More specifically:

In yet a further embodiment of the present invention, the channels have diameters ranging from 0.5 mm to 7 mm. This range provides excellent retention of fine soil particles while allowing for efficient drainage.

In yet a further embodiment of the present invention, the channels can have diameters ranging from 1 mm to 5 mm. This narrower range may be preferred for general-purpose applications, offering a good balance between drainage and soil retention.

In yet a further embodiment of the present invention, the channels can have diameters ranging from 1.5 mm to 3.5 mm. This range is suitable for applications requiring slightly larger drainage capacity while still maintaining adequate soil retention.

In yet a further embodiment of the present invention, the channels can also have diameters ranging from 2 mm to 3 mm. This range provides an optimal balance between drainage and soil retention, suitable for a wide variety of plant types and soil compositions.

The specific choice of channel diameter within these ranges can be tailored to the particular needs of different plant species, soil types, or environmental conditions.

In an alternative embodiment, the plant cultivating container features a base that includes a porous structure integrally formed with the mesh via additive manufacturing. This porous structure extends continuously from the inner surface through the thickness of the base to the outer surface, forming at least a portion of the channels.

The porous structure creates an architecture that allows for the flow of fluid through the mesh base while inhibiting the flow of solid material. In one embodiment, the porous structure comprises interconnected voids with a porosity between 30% and 70%. This range of porosity provides an optimal balance between structural integrity and drainage efficiency. The porous structure can be created using various additive manufacturing techniques. The choice of manufacturing method depends on the specific material being used and the desired properties of the final product.

The additive manufacturing process used to create the pot or container involves a layered construction approach. In accordance with one embodiment of the present invention, the mesh in the base is formed by the sequence of layers in the additive manufacturing process. For example, in reference to FIGS. 4A-4C a series of layers of shown for illustration.

Figure 4A:
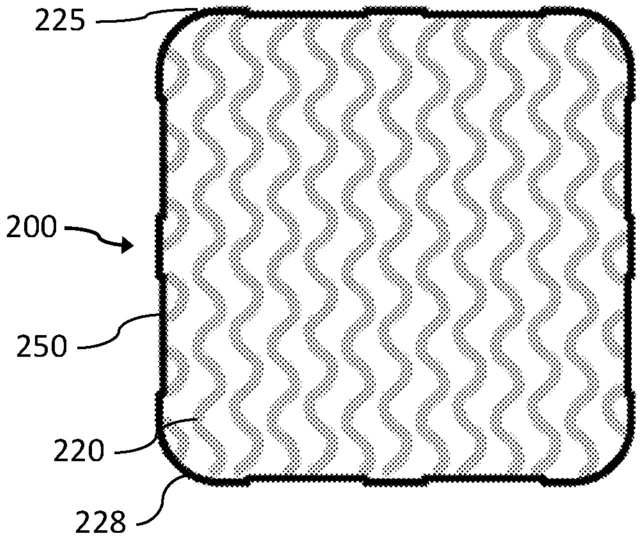
FIG. 4A is a top view of a layer for additive manufacturing the base in accordance with one embodiment of the present invention.

In reference to FIG. 4A, a first layer 200 in a sequence of layers in a layerwise buildup is illustrated. In the illustrated embodiment, the first layer 200 is formed by a Liquid Deposition Modeling (LDM) machine. The first layer 200 comprises a plurality of wavy lines 220 extending from a top 225 to a bottom 228 of the first layer 200. In the embodiment disclosed, the pattern of wavy lines 220 are identical throughout the layer, forming a continuous porous structure uniformly throughout base 12. These wavy lines represent the cross-section of the TPMS structure at this particular layer.

It will be understood by a person of ordinary skill in the art and familiar with the disclosure that the present invention is not limited in this regard, and that the shape or pattern of the lines, and thereby the channels, may vary throughout the base 12. This variability allows for customization of the TPMS structure or to use a different channel structure to optimize drainage, aeration, and structural integrity as needed for different sections of the base.

The lines are formed using the material extruded from the nozzle of the LDM machine. The precision of this process allows for the accurate reproduction of the complex TPMS geometries designed in the CAD model. In this embodiment, the thickness of the lines is uniform throughout the first layer. However, a person of ordinary skill in the art and familiar with the disclosure will understand that the present invention is not limited in this regard, and that the thickness may vary. Such variations in thickness could be used to create areas of different porosity or strength within the base.

In reference to FIG. 4A, the first layer 200 further includes a perimeter 250 that extends around the first layer 200 to define the outside surface of the base 12. This perimeter 250 ensures the overall shape of the base is maintained while allowing for the internal TPMS structure.

It's important to note that while this description focuses on the first layer, the subsequent layers will follow similar patterns, with slight variations to create the three-dimensional TPMS structure. The layerwise buildup process allows for the creation of complex internal geometries that would be impossible to achieve with traditional manufacturing methods.

Figure 4B:
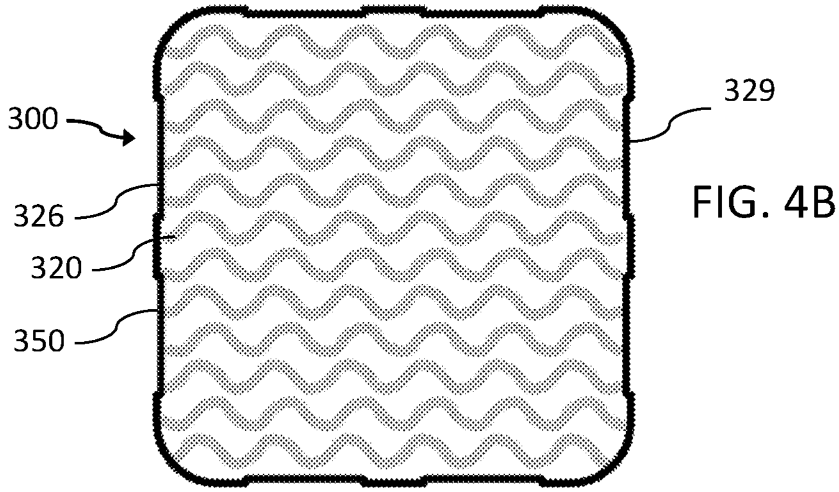
FIG. 4B is a top view of a layer for additive manufacturing the base in accordance with one embodiment of the present invention.

In reference to FIG. 4B, a second layer 300 in the sequence of layers in the layerwise buildup is illustrated. This second layer 300 is designed to be disposed directly on top of the first layer 200 described in FIG. 4A. Like the first layer, the second layer 300 is formed by the Liquid Deposition Modeling (LDM) machine.

The second layer 300 comprises a plurality of wavy lines 320 that extend from left 326 to right 329 of the layer, in contrast to the top-to-bottom orientation of the wavy lines in the first layer 200. The change in orientation affects the creation of the three-dimensional TPMS structure within the base 12. The wavy lines 320 in this layer represent another cross-section of the TPMS structure, perpendicular to the cross-section shown in the first layer 200.

In the embodiment disclosed, the pattern of wavy lines 320 are identical throughout the second layer, maintaining a continuous porous structure. However, it's important to note that the present invention is not limited to this uniform pattern. The shape or pattern of the lines, and consequently the channels they form, may vary across the layer to create specific drainage or structural characteristics in different areas of the base.

As with the first layer, these lines are formed by the material extruded from the nozzle of the LDM machine, precisely following the CAD model to recreate the complex geometries. The thickness of the lines in this second layer is uniform, mirroring the approach taken in the first layer. However, the thickness could potentially vary if required for specific design purposes.

The second layer 300 also includes a perimeter 350 that aligns with the perimeter of the first layer, maintaining the defined outside surface of the base 12. This consistent perimeter ensures the overall shape and dimensions of the base are preserved while the internal TPMS structure is built up.

Figure 4C:
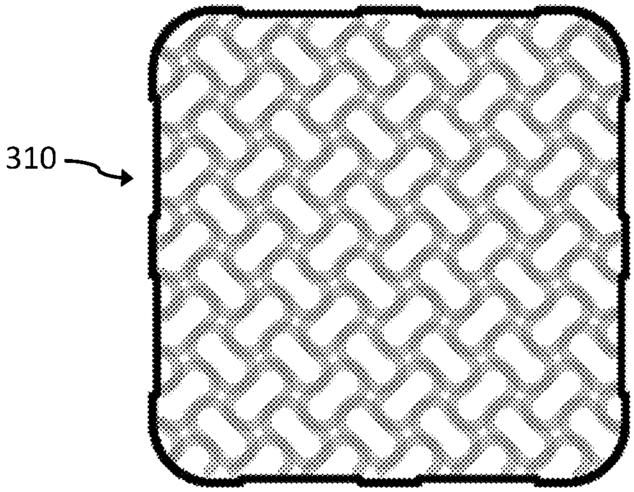
FIG. 4C is a top view of the layer of FIG. 4B disposed on top of the layer of 4A in accordance with one embodiment of the present invention.

In reference to FIG. 4C, a top view of the second layer 300 above the first layer 200 is shown. As is illustrated, the alternating orientation of the wavy lines between the first 200 and second layers (top-to-bottom in the first layer, left-to-right in the second) is creating the interconnected, three-dimensional network of channels that characterizes the TPMS structure. As subsequent layers are added, following similar alternating patterns with variations, for example, in the position, amplitude, and frequency, the complete TPMS geometry of the base 12 will be formed, resulting in a complex, porous structure that optimizes drainage and aeration while maintaining structural integrity.

In reference to the embodiment of the container illustrated in FIG. 1, the container is formed from one hundred layers. This layered structure is a key feature of the additive manufacturing process used to create the complex geometry. It will be understood by a person of skill in the art and familiar with this disclosure that the present invention is not limited in this regard and the number of layers may vary. The specific number of layers can be adjusted based on factors such as the desired height of the container, the resolution of the manufacturing process, and the complexity of the TPMS structure. In the embodiment disclosed, the base 12 is formed from ten layers. This ten-layer structure for the base allows for a sufficiently complex TPMS geometry while maintaining manufacturing efficiency.

Figure 5:
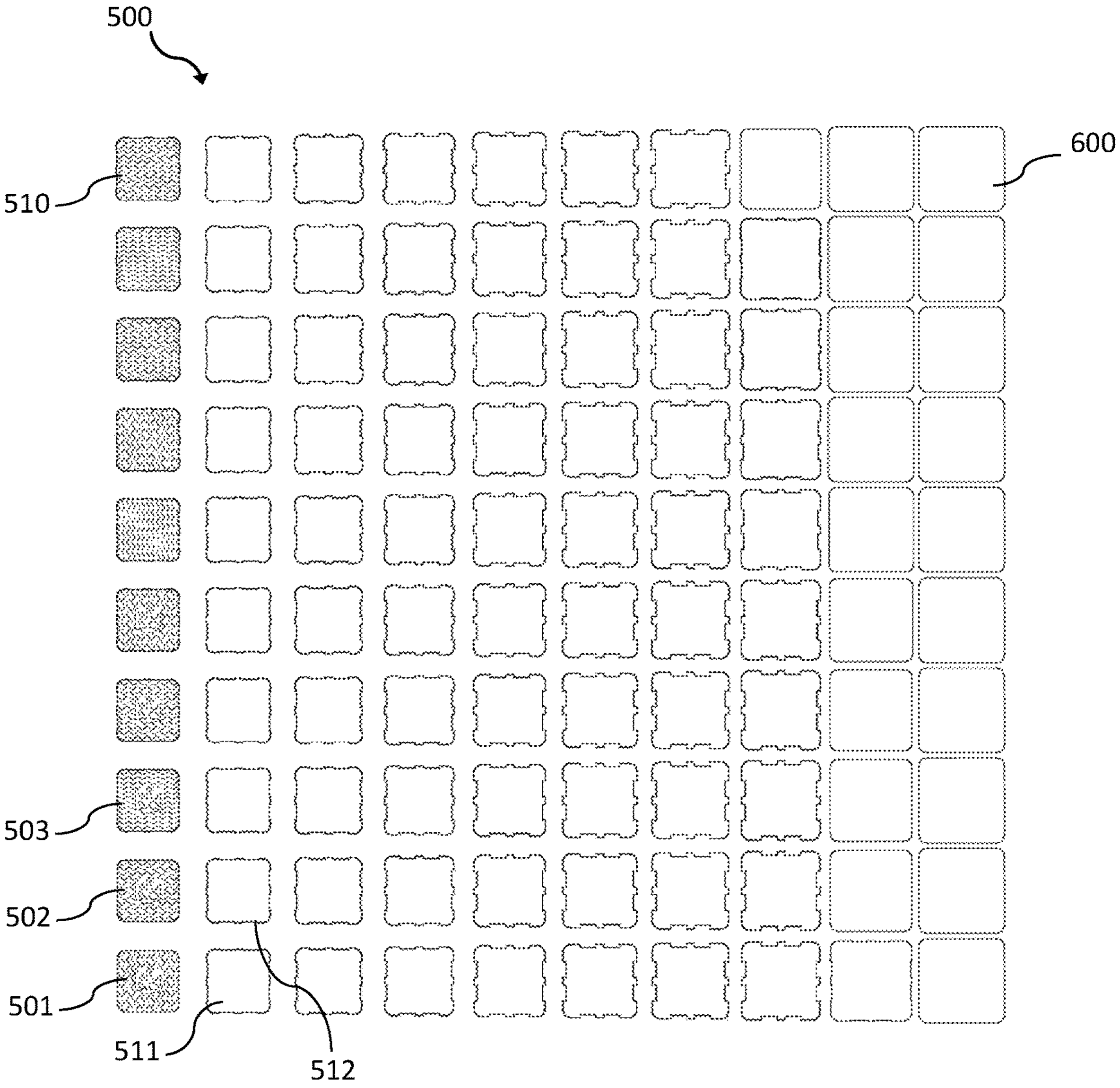
FIG. 5 shows a top view of a plurality of layers for forming a container via additive manufacturing in accordance with one embodiment of the present invention.

In reference to FIG. 5, an assembly 500 of the layers for the build is illustrated, providing a visual representation of the layerwise construction process. The first layer 501 is set forth in the bottom left of the figure, representing the starting point of the build. The last layer 600 is set forth in the top right, showing the completion of the container. This arrangement allows for a clear visualization of the build sequence.

The second layer 502 is positioned in the first column immediately above the first layer 501, followed by the third layer 503 immediately above the second layer 502. This vertical stacking in the first column continues up to the tenth layer 510, which is the top layer illustrated in the first column. This column represents the complete structure of the base 12.

The eleventh layer 511 begins the construction of the wall of the container and is shown as the bottom layer in the second column. The twelfth layer 512 is positioned above the eleventh layer, continuing the build of the container wall. The sequence of layers continues in this pattern, with each column representing a vertical section of the container's construction.

This visual representation in FIG. 5 effectively illustrates the layer-by-layer additive manufacturing process used to create the container. It demonstrates how the complex TPMS structure of the base transitions into the simpler geometry of the container walls. The arrangement also allows for easy identification of any layer in the build process, which can be crucial for quality control and optimization of the manufacturing process.

Table 1 illustrates the layer-by-layer structure of the base, detailing the characteristics of each of the ten layers. The layers alternate between Up/Down (U/D) and Left/Right (L/R) orientations, creating the interwoven structure to form the TPMS geometry. Layers 1, 5, 6, and 7 have a U/D orientation, while layers 2, 3, 4, 8, 9, and 10 have an L/R orientation with a 270-degree L-Direction. The table also specifies whether each layer features wavy or concentric patterns. Layers 1, 2, 4, 5, 7, 8, and 10 utilize wavy patterns, which contribute to the complex channel structure of the TPMS. In contrast, layers 3, 6, and 9 employ concentric patterns. This alternating pattern of orientations and design features throughout the ten layers enables the creation of a sophisticated, three-dimensional drainage system within the base, optimizing both fluid flow and structural integrity.

| LAYER | DIRECTION | WAVY OR CONCENTRIC |
|---|---|---|
| 501 | VERTICAL | WAVY-2 |
| 502 | HORIZONTAL | WAVY-1 |
| 503 | HORIZONTAL | CONCENTRIC |
| 504 | HORIZONTAL | WAVY-2 |
| 505 | VERTICAL | WAVY-1 |
| 506 | VERTICAL | CONCENTRIC |
| 507 | VERTICAL | WAVY-2 |
| 508 | HORIZONTAL | WAVY-1 |
| 509 | HORIZONTAL | CONCENTRIC |
| 510 | HORIZONTAL | WAVY-2 |

This process is illustrated in FIGS. 4A, 4B, and 4C, which show top views of individual layers and their assembly.

FIG. 4A shows a top view of a single layer 200 for additive manufacturing the base. This layer includes the pattern of channels or pores that will form part of the drainage system.

FIG. 4B illustrates a subsequent layer 300, which may have a slightly different pattern to create the complex three-dimensional structure of the TPMS or porous architecture.

FIG. 4C shows how layer 300 is disposed on top of layer 200, demonstrating how the three-dimensional structure 310 is built up layer by layer.

Figure 6:
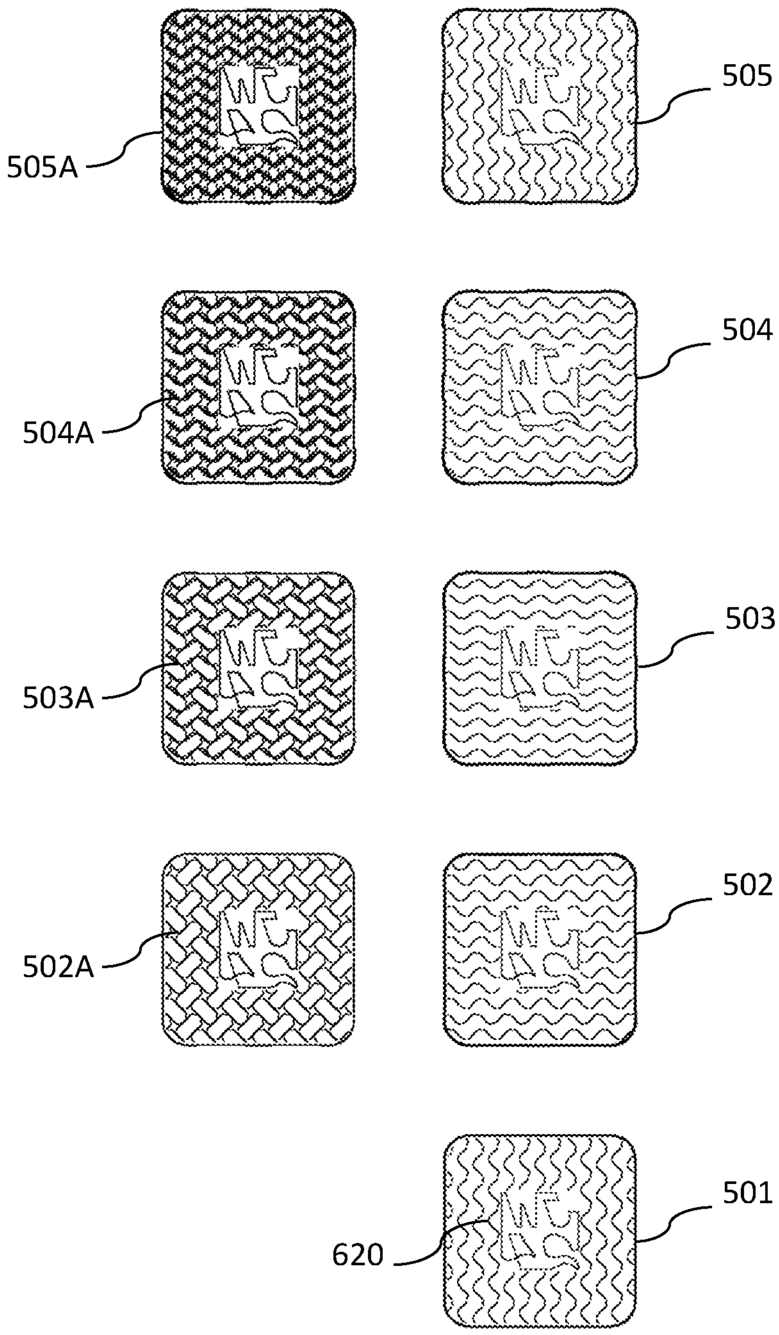
FIG. 6 shows a top view of a plurality of layers for forming a portion of a container via additive manufacturing in accordance with one embodiment of the present invention.

FIG. 6 provides a detailed illustration of the layerwise construction process for the base 12 of the container, focusing on the first five layers. In the right column of the figure, layers 501, 502, 503, 504, and 505 are shown individually, allowing for a clear view of each layer's specific pattern and orientation. This individual representation helps in understanding the unique contribution of each layer to the overall structure.

The left column of FIG. 6 demonstrates the cumulative build-up of these layers, providing a visual representation of how the gyroid structure of the base 12 is formed. For instance, 502A shows the combination of layer one 501 and layer two 502. This composite view illustrates how the different orientations and patterns of these two layers interact to begin forming the three-dimensional structure. Similarly, 503A displays the combination of the first layer 501, the second layer 502, and the third layer 503, further demonstrating the progression of the gyroid formation.

This pattern continues in this manner for the subsequent layers. 504A represents the combination of the first four layers, while 505A shows all five layers together. This sequential representation enables a clear visualization of the gradual formation of the gyroid structure in the base 12 of the container.

In reference to the buildup shown in FIG. 5, a design trademark is formed in the mesh base. For example, this is partially illustrated in layers 501, 502, 503. The purpose of the design trademark is to designate the source of the build, or, in some cases, to provide an aesthetic element. In this manner, the design element deviates from the TPMS structure. A person of ordinary skill in the art and familiar with this disclosure will understand that the present invention is not limited in this regard, and may be practiced without inclusion of the design. Likewise, the position and size of the design may vary without departing from invention.

Figure 7:
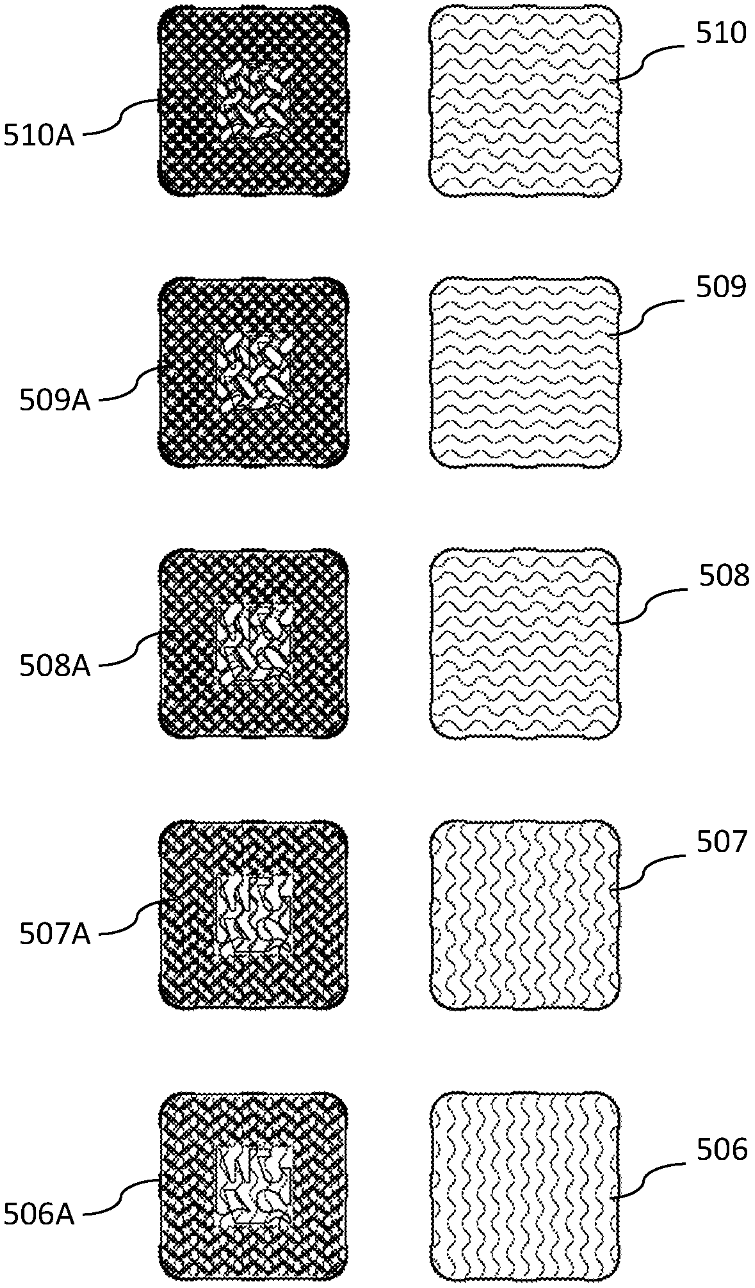
FIG. 7 shows a top view of a plurality of layers for forming a portion of a container via additive manufacturing in accordance with one embodiment of the present invention.

FIG. 7 continues the detailed illustration of the layerwise construction process for the base 12 of the container, focusing on the next five layers, which are layers 506, 507, 508, 509, and 510. In the right column of the figure, these layers are shown individually, allowing for a clear view of each layer's specific pattern and orientation. This individual representation helps in understanding how the upper half of the base 12 is constructed and how it complements the lower layers shown in FIG. 6.

The left column of FIG. 7 demonstrates the cumulative build-up of these layers, providing a visual representation of how the gyroid structure of the base 12 continues to develop. For instance, 506A shows the combination of all layers from 501 through 506. This composite view illustrates how the different orientations and patterns of these six layers interact to further develop the three-dimensional TPMS structure. Similarly, 507A displays the combination of the first seven layers, 508A shows the first eight layers, and so on.

This pattern continues in this manner for the subsequent layers. 509A represents the combination of the first nine layers, while 510A shows all ten layers together, completing the base 12 of the container. This sequential representation enables a clear visualization of the final stages in the formation of the gyroid structure in the base 12.

In reference to FIG. 6, the first five layers 501, 502, 503, 504, and 505 incorporate an aesthetic pattern 620 that interrupts the regular structure of the lines forming the TPMS geometry. This pattern 620 is designed to provide a point of visual distinction for the product, adding a unique aesthetic element to the functional design of the base. The integration of this pattern demonstrates the flexibility of the additive manufacturing process, allowing for the incorporation of decorative elements without compromising the structural integrity or functionality of the TPMS design. It will be understood by a person of skill in the art and familiar with this invention that this aesthetic distinction is not a functional requirement of the structure. The present invention can be practiced without this pattern, maintaining its full functionality in terms of drainage and structural properties. This flexibility allows for the production of either decorative or purely functional versions of the product, depending on the specific application or market demands.

Figure 8A:
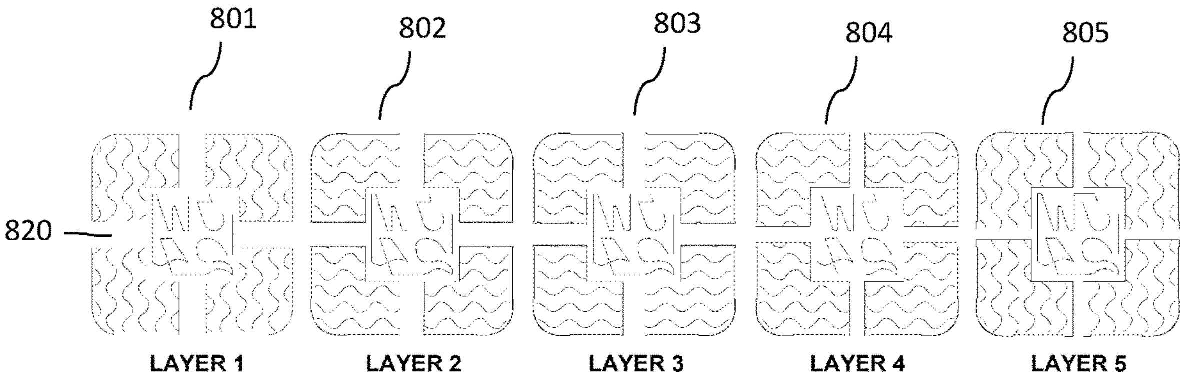
FIG. 8A is a top view of a plurality of layers for forming a portion of a container via additive manufacturing in accordance with one embodiment of the present invention.
Figure 8B:
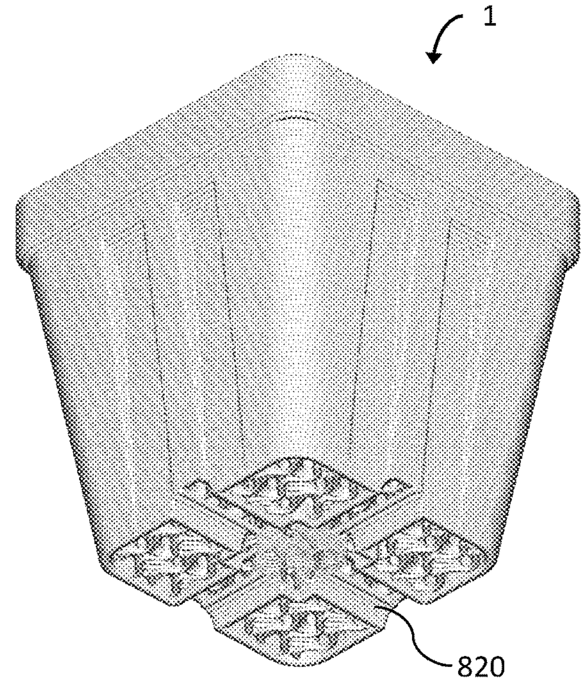
FIG. 8B shows a perspective view of the container formed from the layers illustrated in FIG. 8A.

In reference to FIGS. 8A and 8B, an alternative embodiment is disclosed which showcases another potential variation in the base design. In this embodiment, the first five layers of the base are configured to define lateral drainage channels 820 on the bottom surface of the base. These channels extend from a center portion to an edge, creating a radial drainage pattern. The primary purpose of these channels 820 is to facilitate the flow of fluid or air through the system, potentially enhancing the drainage and airflow capabilities of the base beyond what is achieved by the structure alone. In reference to FIG. 8A, the first five layers 801, 802, 803, 804, 805 are illustrated, clearly showing the formation of the channel 820 through the layered construction process. This figure demonstrates how the additive manufacturing technique can be used to create macro-scale features (the channels) in addition to the micro-scale TPMS structure. FIG. 8B provides a perspective view of the entire container, illustrating how these channels 820 integrate with the overall design of the pot. This alternative embodiment highlights the versatility of the additive manufacturing process in creating customized drainage solutions, allowing for the combination of TPMS structures with more traditional drainage channel designs to optimize plant health and water management.

The inventor has discovered that the pot and container described in this invention offer several significant benefits over traditional planters.

Improved Drainage: The 3-dimensional drainage system created by the TPMS or porous structure provides superior water management compared to traditional perforated bases. This helps prevent waterlogging and root rot, promoting healthier plant growth.

Soil Retention: The carefully designed channels or pores in the base effectively retain soil and growing medium while allowing water to pass through. This reduces mess and conserves potting soil, addressing a common issue with conventional planters.

Environmental Sustainability: The optional use of biodegradable or ceramic materials for the wall and the base reduces the environmental impact associated with traditional plastic planters. This aligns with growing consumer demand for eco-friendly gardening products.

Customizability: The additive manufacturing process allows for easy customization of pot designs. Different TPMS structures, channel sizes, or overall shapes can be produced to suit specific plant needs or aesthetic preferences.

Durability: The ceramic base offers excellent durability and resistance to weathering, potentially extending the lifespan of the planter compared to plastic alternatives.

Improved Plant Health: The combination of efficient drainage and aeration provided by the innovative base design creates an optimal environment for root growth, potentially leading to healthier and more robust plants.

Versatility: The design is suitable for a wide range of plants and growing conditions, from small indoor houseplants to larger outdoor specimens.

Aesthetic Appeal: The unique structure of the TPMS or porous base can provide an interesting visual element, potentially enhancing the overall aesthetic of the planter.

While specific embodiments have been described in detail, it should be understood that various changes, substitutions, and alterations can be made to the described embodiments without departing from the spirit and scope of the invention as defined by the appended claims.

For example, while certain TPMS structures (gyroid, Schwarz diamond, and Schwarz primitive) have been specifically mentioned, other TPMS structures or variations thereof could be employed to achieve similar benefits.

The materials mentioned for the wall and base are exemplary, and other suitable materials could be used. For instance, bioplastics derived from algae or mycelium-based materials could be explored for the biodegradable wall and base components.

The dimensions of the channels or pores in the base can be further optimized for specific plant species or growing conditions. Future iterations of the design could incorporate smart materials that can adapt their porosity based on moisture levels.

While the additive manufacturing processes described focus on LDM, FDM, and SLA, other emerging 3D printing technologies could potentially be applied to manufacture these planters as they become more refined and cost-effective.

While the previous embodiments have focused on the application of TPMS structures in plant containers, it is important to note that the present invention is not limited to horticultural applications. The unique properties of TPMS structures, combined with the flexibility of additive manufacturing techniques, allow for a wide range of potential applications across various industries.

One such application is in the field of culinary tools and kitchenware. The TPMS structure can be effectively utilized in the design of colanders, strainers, baking racks, and splatter guards. Traditional plastic colanders can be sensitive to heat, allow washed food to fall out of colander, and might splash water due to rapid drainage. A colander incorporating a TPMS-based mesh structure could provide superior drainage characteristics while effectively retaining even small food particles. Baking racks would allow for ventilation and drainage while providing support and thermal resistance. The mesh surface could even be used to create a distinct patterned surface on objects. The ceramic TPMS mesh structure could be used in a splatter guard to allow ventilation but protect the user from harmful substances.

One such application is in the field of housewares. The TPMS ceramic structure creates an optimal surface for a soap bar tray, tooth brush holder, or accessories container. Bathroom items like soap trays and toothbrush holders are often grimy on the bottom from sitting in water with poor aeration. A TPMS ceramic mesh would be ideal to drain water, while leaving valuables like toothbrushes and soap in place. The structure could be incorporated into tiles for bathroom or kitchen settings, thus integrating the invention into the built environment.

In the realm of construction and building products, ceramic TPMS structures offer plastic-free alternatives to existing devices and better integration with the built environment. Ceramic TPMS could be used in building applications such as: gutters, planters integrated into the façade and/or landscape, rain water harvesting filters, stormwater management, geotextiles, decking systems, paver systems, decorative screen, weather barriers, fencing, exterior panels, and rainscreen systems. Pavers would allow for pervious surfaces that allow groundwater to quickly seep back into the earth while providing a structural surface. On building exteriors, the ceramic TPMS structure could provide visual privacy/aesthetic interest while filtering out water and particles.

In the realm of filtration systems, the TPMS structure shows great promise. From water filters to air purification systems. The intricate network of channels in a TPMS structure provides an extensive surface area for particle capture while maintaining high flow rates. This could result in more effective removal of contaminants without significantly increasing pressure drop across the filter. Moreover, the scalability of TPMS structures allows for the design of filters with varying pore sizes, potentially enabling multi-stage filtration within a single, compact unit. Using the process described above, plastic filters could be replaced with 3-dimensional ceramic filters. Air filters could be cleaned and reused.

The present invention's application of TPMS structures in consumer products extends to items such as shower heads and faucet aerators. A TPMS-based shower head could provide a more uniform and efficient water distribution, potentially reducing water consumption while improving user experience. Similarly, faucet aerators incorporating TPMS geometries could offer improved water flow characteristics and better mixing of air and water, leading to a more satisfying and efficient use of water in household and commercial settings.

The present invention's application of TPMS structures also extends to the design of packaging materials. TPMS-based cushioning elements could provide superior protection for delicate items during shipping and handling. The customizable nature of these structures would allow for the optimization of cushioning properties based on the specific needs of the item being protected, potentially leading to more efficient use of packaging materials and improved product safety during transit. The mesh acts as a filter to allow air and force to be distributed around the object.

It should be understood that while specific applications have been described, the present invention is not limited to these particular uses. The unique properties of TPMS structures, combined with the flexibility offered by additive manufacturing techniques, open up a vast array of potential applications across numerous industries. Future developments may uncover additional uses for TPMS structures that have not been explicitly described herein. The present invention encompasses all such applications of TPMS structures, whether currently known or yet to be discovered, that leverage the principles and manufacturing methods described in this disclosure.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A pot for cultivating a plant comprising:

a wall extending between a top and a bottom, the wall defining a cavity between the top and the bottom for receiving a plant and an organic growing material associated with the plant;

a plant opening between an area outside the cavity and an area inside the cavity defined at least in part by the top of the wall;

a base proximate to the bottom of the wall and further defining the cavity, the base having an inner surface adjacent to the cavity and an outer surface adjacent to the area outside of the cavity, the base having a thickness between the inner surface and the outer surface and the base and the wall retain the plant and the organic growing material in the cavity;

the base comprising a mesh having a plurality of channels therein, each of the channels providing fluid communication between the cavity and the area outside of the cavity;

wherein each channel defines a three dimensional tortuous path extending from the inner surface through the thickness of the base to the outer surface of the base, the tortuous path forming an architecture that provides for the flow of fluid through the mesh base while inhibiting the flow of solid material through the mesh base.

2. The pot for cultivating a plant of claim 1, wherein the base further comprises:

a Triply Periodic Minimal Surface (TPMS) portion integrally formed with the base via 3D printing, between the inner surface through the thickness of the base to the outer surface of the base.

3. The pot for cultivating a plant of claim 2, wherein the TPMS portion forms the channels.

4. The pot for cultivating a plant of claim 3, wherein the TPMS portion form at least a portion of the architecture that provides for the flow of fluid through the mesh base while inhibiting the flow of solid material through the mesh base.

5. The pot for cultivating a plant of claim 4, wherein the TPMS portion forms a gyroid architecture.

6. The pot for cultivating a plant of claim 2, wherein the 3D printing comprises liquid deposition modeling.

7. The pot for cultivating a plant of claim 1, wherein the wall and mesh base are made of a biodegradable material.

8. The pot for cultivating a plant of claim 1, wherein the wall and mesh base are made of a ceramic material.

9. The pot for cultivating a plant of claim 7, wherein the biodegradable material of the wall includes a composite of natural fibers and a biodegradable polymer.

10. The pot for cultivating a plant of claim 8, wherein the ceramic material of the mesh base includes alumina, zirconia, kaolin, silica, feldspar or a combination thereof.

11. The pot for cultivating a plant of claim 1, wherein the channels in the mesh base have a diameter ranging from 0.5 mm to 5 mm to allow optimal fluid drainage while retaining the growing material.

12. The pot for cultivating a plant of claim 11, wherein the channels in the mesh base have a diameter ranging from 0.5 mm to 4 mm.

13. The pot for cultivating a plant of claim 11, wherein the channels in the mesh base have a diameter ranging from 1 mm to 4 mm.

14. The pot for cultivating a plant of claim 11, wherein the channels in the mesh base have a diameter ranging from 1.5 mm to 3.5 mm.

15. The pot for cultivating a plant of claim 11, wherein the channels in the mesh base have a diameter ranging from 2 mm to 3 mm.

16. A plant cultivating container comprising:

a wall extending between a top and a bottom, the wall defining a cavity between the top and the bottom for receiving a plant and an organic growing material associated with the plant;

a plant opening between an area outside the cavity and an area inside the cavity defined at least in part by the top of the wall;

a base proximate to the bottom of the wall and further defining the cavity, the base having an inner surface adjacent to the cavity and an outer surface adjacent to the area outside of the cavity, the base having a thickness between the inner surface and the outer surface, wherein the base and the wall retain the plant and the organic growing material in the cavity;

the base comprises a mesh having a plurality of channels therein, each of the channels providing fluid communication between the cavity and the area outside of the cavity, and the base further includes a porous structure integrally formed with the mesh via additive manufacturing, the porous structure extending continuously from the inner surface through the thickness of the base to the outer surface of the base, thereby forming at least a portion of the channels;

wherein each channel defines a three-dimensional tortuous path extending from the inner surface through the thickness of the base to the outer surface of the base, the tortuous path forming an architecture that provides for the flow of fluid through the mesh base while inhibiting the flow of solid material through the mesh base.

17. The plant cultivating container of claim 16, wherein the porous structure forms an architecture that provides for the flow of fluid through the mesh base while inhibiting the flow of solid material through the mesh base.

18. The plant cultivating container of claim 17, wherein the porous structure comprises interconnected voids with a porosity between 30% and 70%.

19. The plant cultivating container of claim 18, wherein the additive manufacturing comprises liquid deposition modeling, fused deposition modeling, or stereolithography.

20. The plant cultivating container of claim 16, wherein the wall and base are made of a biodegradable material comprising a composite of natural fibers and a biodegradable polymer.

21. The plant cultivating container of claim 16, wherein the mesh base and walls are made of a ceramic material selected from the group consisting of alumina, zirconia, kaolin, silica, feldspar or a combination thereof.

22. A container comprising:

a wall extending between a top and a bottom, the wall defining a cavity between the top and the bottom for receiving matter;

an opening between an area outside the cavity and an area inside the cavity defined at least in part by the top of the wall;

a base proximate to the bottom of the wall and further defining the cavity, the base having an inner surface adjacent to the cavity and an outer surface adjacent to the area outside of the cavity, the base having a thickness between the inner surface and the outer surface;

the base comprising a mesh having a plurality of channels therein, each of the channels providing fluid communication between the cavity and the area outside of the cavity;

wherein each channel defines a three-dimensional tortuous path extending from the inner surface through the thickness of the base to the outer surface of the base, the tortuous path forming an architecture that provides for the flow of fluid through the mesh base while inhibiting the flow of solid material through the mesh base.

23. The container of claim 22, wherein the base further comprises:

a Triply Periodic Minimal Surface (TPMS) portion integrally formed with the base via 3D printing, between the inner surface through the thickness of the base to the outer surface of the base.

24. The container of claim 23, wherein the TPMS portion forms the channels.

25. The container of claim 24, wherein the TPMS portion forms at least a portion of the architecture that provides for the flow of fluid through the mesh base while inhibiting the flow of solid material through the mesh base.

26. The container of claim 25, wherein the TPMS portion forms a gyroid architecture.

27. The pot for cultivating a plant of claim 23, wherein the 3D printing comprises liquid deposition modeling.

28. The pot for cultivating a plant of claim 22, wherein the channels in the mesh base have a diameter ranging from 0.5 mm to 5 mm to allow optimal fluid drainage while retaining the growing material.

* * * * *